United States Patent [19]

Strugach

[11] Patent Number: 4,596,158
[45] Date of Patent: Jun. 24, 1986

[54] TUNED GYROSCOPE WITH DYNAMIC ABSORBER

[75] Inventor: Michael Strugach, Canoga Park, Calif.

[73] Assignee: Litton Systems, Inc., Beverly Hills, Calif.

[21] Appl. No.: 455,667

[22] Filed: Jan. 5, 1983

[51] Int. Cl.[4] ............................................. G01C 19/06
[52] U.S. Cl. ........................................ 74/5 F; 74/5.5; 74/574
[58] Field of Search ............... 74/5.5, 574, 5 R, 5 F

[56] References Cited

U.S. PATENT DOCUMENTS

| | | | |
|---|---|---|---|
| 2,766,626 | 10/1956 | Ritter | 74/5.5 |
| 2,779,211 | 1/1957 | Henrich | 74/574 |
| 4,223,565 | 9/1980 | Sugiyama et al. | 74/574 |

FOREIGN PATENT DOCUMENTS

| | | | |
|---|---|---|---|
| 835314 | 5/1960 | United Kingdom | 74/574 |
| 896548 | 5/1962 | United Kingdom | 74/574 |

Primary Examiner—Rodney H. Bonck
Attorney, Agent, or Firm—Edmund W. Rusche

[57] ABSTRACT

A tuned gyroscope incorporates a dynamic absorber for lessening the transmissibility of resonant vibrations. A damping mass is symmetrical about a rotating element of the gyroscope. A symmetrical arrangement of elastomeric material is utilized to mount the mass to such rotating element. The mass and elastomeric material are so chosen with respect to geometry and material composition that out-of-phase vibrations are induced within the damping apparatus upon the onset of resonant vibrations to minimize the transmissibility of such vibrations with respect to the elements of the tuned gyroscope.

14 Claims, 6 Drawing Figures

TUNED GYROSCOPE WITH DYNAMIC ABSORBER

BACKGROUND OF THE INVENTION

1. Field of the Invention

The present invention relates to means for damping vibrations. More particularly, this invention relates to apparatus for lessening the effect of resonant vibrations upon a tuned gyroscope.

2. Description of the Prior Art

Dry tuned gyroscopes (i.e., those not mounted in a fluid or air suspension but by means of a flexible hinge or spring) are subject to error and damage resulting from characteristically large transmissibilities (both radial and axial) at structural resonance. Numerous attempts have been made to solve this sometimes-critical problem. Prominent among these efforts have been platform-isolation systems, necked down shafts and shaft elastomer damping. Systems employing platform-isolation are quite expensive and require additional instrumentation and space. Necked-down shafts and shaft elastomer damping have been found to decrease the system time constant without providing an effective solution to the problem at hand.

Thus, at the present time, there does not exist sufficiently simple and effective apparatus for moderating the resonant vibrations of a dry tuned gyroscope.

SUMMARY OF THE INVENTION

The present invention overcomes the shortcomings of the prior art by providing an absorber for reducing the transmissibility of resonant vibrations in a gyroscope of the type that includes at least one rotatable element. Such absorber comprises a reactive mass that is symmetrical with respect to the element and means for mounting the mass to the element, such means including at least one elastomeric body.

In a further aspect, the present invention presents a tuned gyroscope having improved vibration characteristics at resonance. Such gyroscope includes at least one rotatable element. A reactive mass is symmetrical with respect to the element and there is provided means for mounting the mass to the element, such means including at least one elastomeric body.

The foregoing features and advantages of the invention will become further apparent from the detailed description which follows. This description is accompanied by a set of drawings in which like numerals refer to like features throughout.

DETAILED DESCRIPTION

Figure 1:
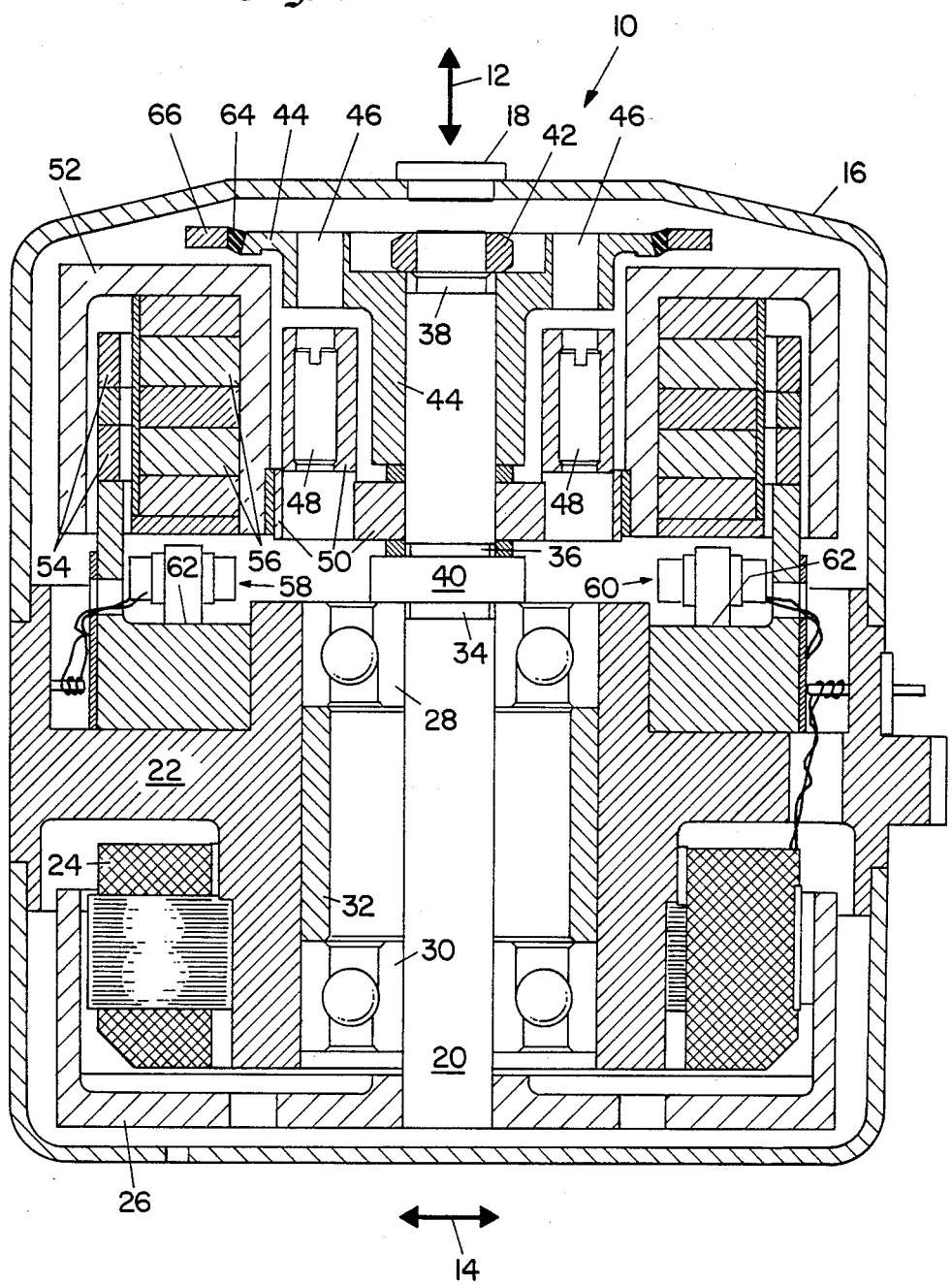
FIG. 1 is a side sectional view of a tuned gyroscope including dynamic absorber in accordance with the present invention.

Turning now to the drawings, FIG. 1 is a side sectional view of a tuned gyroscope 10 incorporating a dynamic absorber in accordance with the present invention. The gyroscope 10 and its elements are generally cylindrical and/or circular, being substantially symmetrical about the axis of rotation of a central shaft 20, discussed infra. As mentioned above, the invention achieves substantial advantage in operation over similar gyroscopic systems (not including an absorber) by improving accuracy and lessening vulnerability to damage when operated in environments of resonant vibrations, in both axial (as shown by the double-headed arrow 12) and radial (as shown by the double-headed arrow 14).

A sealed casing 16 encloses the gyroscope 10. During operation, a vacuum is created therein and a plug 18 is provided to facilitate outgassing prior to use. The shaft 20 extends a substantial portion of the height of the casing 16. The lower half of the gyroscope 10 is formed of a solid case 22. An electric motor 24, fitted within a cavity formed in the case 22, and a hysteresis ring 26 are positioned in the lower half of the gyroscope for driving the shaft 20. Bearings 28 and 30, separated by a cylindrical spacer 32, facilitate rotation of the shaft 20 in response to energization of the motor 24.

The shaft 20 includes reduced portions 34, 36 and 38 and an enlarged collar portion 40 and, at its topmost portion, is threadedly engaged to a nut 42. The nut 42 rigidly secures the shaft 20 to a generally cylindrical rotor stop 44 that includes a plurality of openings 46 for access to adjustment screws 48. The screws 48 allow the operator to adjust the mass unbalance of the rotor. A conventional flexible two degree of freedom suspension assembly 50 includes "hinges" (not shown) joining the rotating shaft 20 to the rotor 52.

A recess within the rotor 52 acts as a housing for four sets of torquer coils, one of which is shown as coil 54. The four coils interact with permanent magnets 56 to apply a corrective torque to the rotor 52 when a change in platform/rotor position is sensed via the detection of a voltage error signal across pickoff transformers 58 and 60. Such a signal indicates that the rotor 52, flexibly attached to the other mechanisms of the gyroscope 10, is no longer in alignment with the remainder of the gyroscope-and-platform system. The pickoff transducers are seated upon a base 62 that is independent of rotor orientation.

Extending from an inclined peripheral edge of the rotor stop 44 is an inner ring 64 of elastomeric material that is inclined with respect to the edge of the rotor stop 44 and joins an outer damping ring 66 formed of a dense metal. The combination of elastomeric inner ring 64 and metallic outer ring 66 shown constitutes a preferred embodiment of the dynamic absorber and, in combination with the other elements of FIG. 1, presents an improved gyroscope 10 having enhanced accuracy and durability when subjected to environments that include resonant vibrations.

Figure 2A:
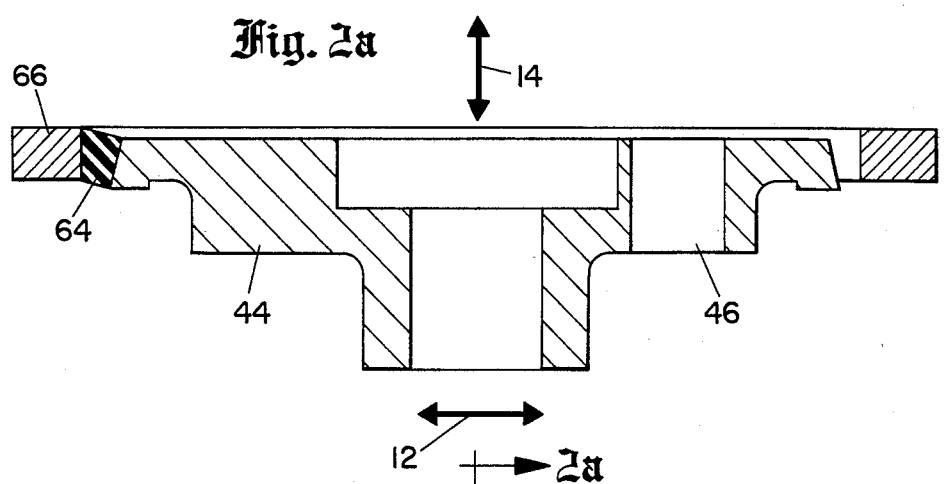
FIGS. 2a and 2b present detailed sectional and top views respectively of a rotor stop incorporating damping mechanism, the side sectional view of FIG. 2a being taken along the line 2a–2a of FIG. 2b.
Figure 2B:
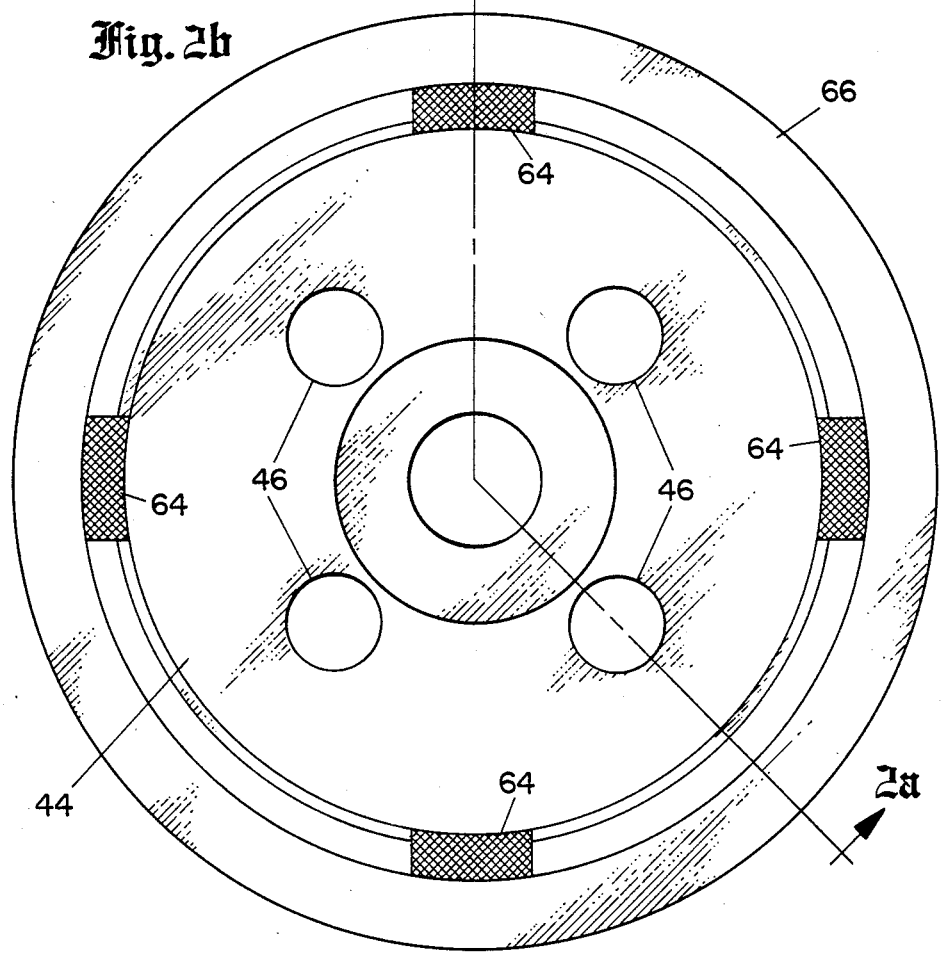

FIGS. 2a and 2b disclose the rotor stop 44 and dynamic absorber of FIG. 1 in greater detail. The elastomeric inner ring 64 is angularly oriented with respect to the top of the rotor stop 44 to distribute the shear and compressive strengths of the absorber, producing reactive forces that act in both radial 12 and axial 14 directions during operation. By orienting the elastomeric inner ring 64 to achieve a mixture of elastic properties in orthogonal directions, the designer increases the spectrum of suitable elastomeric materials. As a result, substantial discrepancies between the shear and compression characteristics of a type of material need not eliminate it from consideration as the elastic component of the absorber. As may be noted from FIG. 2b, the inner ring 64 of the illustrated configuration is not a unitary piece of elastomeric material; rather, the inventor has found that a plurality of elastomeric pieces arranged symmetrically with respect to the axis of rotation of the rotor stop 44, in combination with a symmetric damping mass, can be arranged to produce preselected damping at resonance.

The outer ring 66 acts as a reactive mass damper. Due to the discrepancy in size between the masses of the gyroscope and the outer ring 66 that must fit within an otherwise-conventional gyroscope 10, it is often desirable to fabricate the outer ring 66 of a relatively-dense metal. Tungsten, which is nearly two and one half times as dense as the iron or steel that comprises the bulk of a gyroscope, constitutes such a material. As will be seen from the analysis of the system that follows, the angle of the inclined peripheral edge of the rotor stop 44 at the junction of the elastomeric inner ring 64 therewith and that of the inner edge of the metallic outer ring 66 constitute critical design features. While the specific design choice will vary in accordance with the size of the gyroscope 10, its speed of operation and resonant frequencies, an absorber in accordance with FIGS. 2a and 2b has been successfully reduced to practice having angles of 80° and of 90°, respectively. Inner rings of the aforesaid geometry have been fabricated of a number of different silicon elastomers, including those commercially available from Barry Controls of Burbank, Calif. under product designations 35, 50 and 65–70 DURO (both high damp and low damp).

Figure 3:
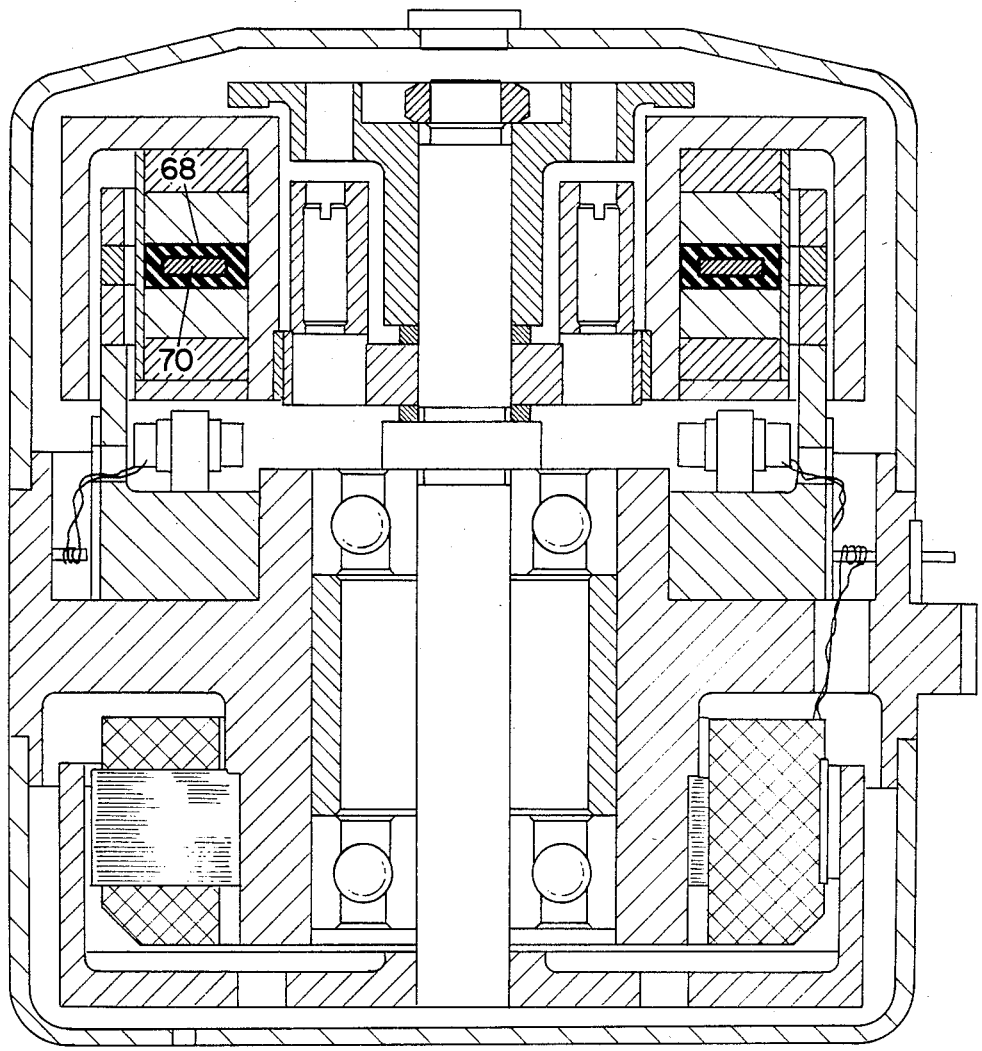
FIG. 3 is a side sectional view of an alternative configuration wherein the absorber is mounted to the rotor of the gyroscope.
Figure 4:
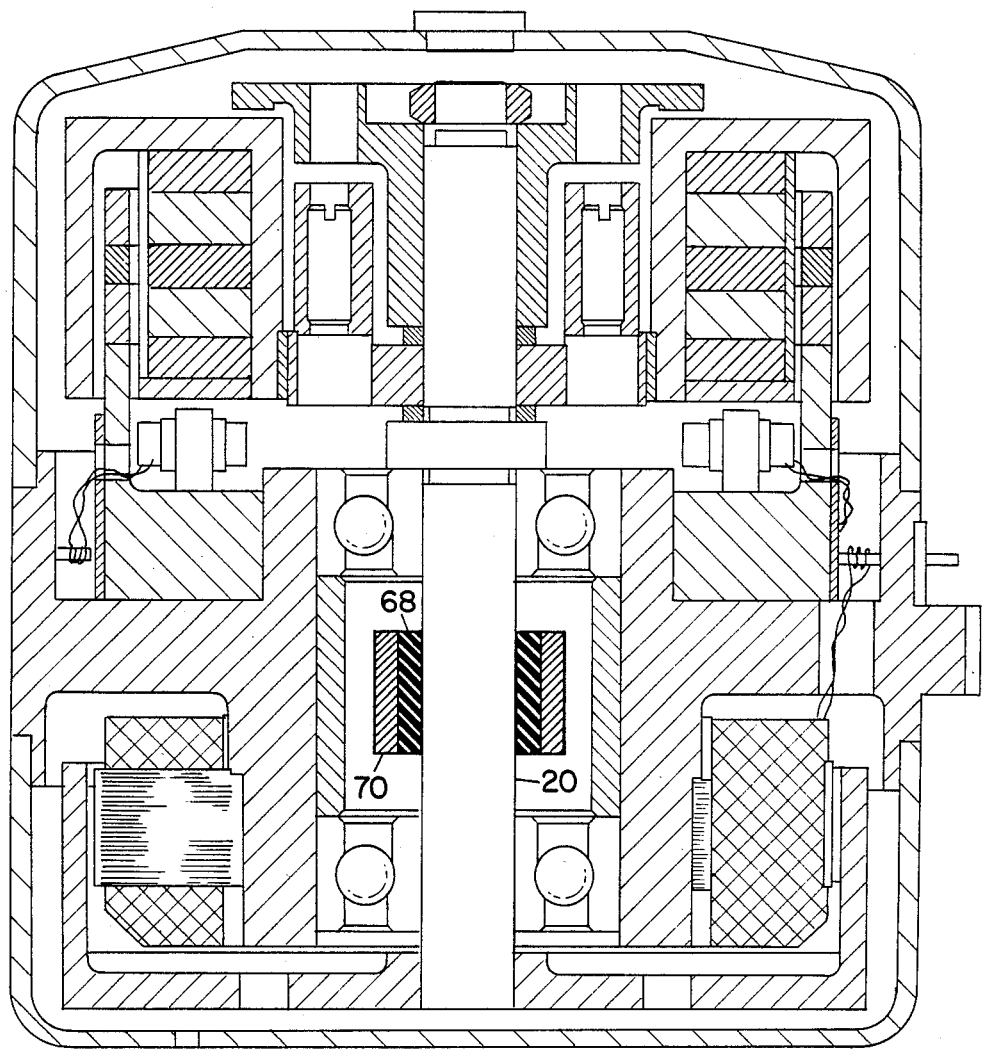
FIG. 4 is a side sectional view of a further alternative configuration wherein the absorber is mounted to the shaft of the gyroscope.

As mentioned above, a variety of designs may be derived in accordance with the present invention to achieve preselected damping of the otherwise-harmful resonant vibrations (in both axial and radial directions) of a dry tuned gyroscope. Specific designs vary; however, in each, it is essential that the reactive mass be generally circular or cylindrical, its axis or center coincident with the axis of rotation of the element of the gyroscope to which it is engaged, and that the composite geometry of the elastomeric material between the element and the mass be symmetrical thereabout. FIGS. 3 and 4 disclose alternative arrangements in accordance with the invention wherein an absorber, comprising elastomeric material 68 and reactive mass 70 configured as above, is mounted to the rotor 52 and to the body of the shaft 20, respectively, of a gyroscope.

Within the above constraints, numerous designs may be achieved, the reactive mass being joined to a rotating element of the gyroscope by means of elastomeric material. The designer must take into consideration such factors as mass, inertia, geometry, density, etc., with respect to choice of the reactive mass and, insofar as the choice of elastomeric body (single piece or multiple pieces), must also take into account the various elastic moduli that are relevant to the operation of the overall system.

Figure 5:
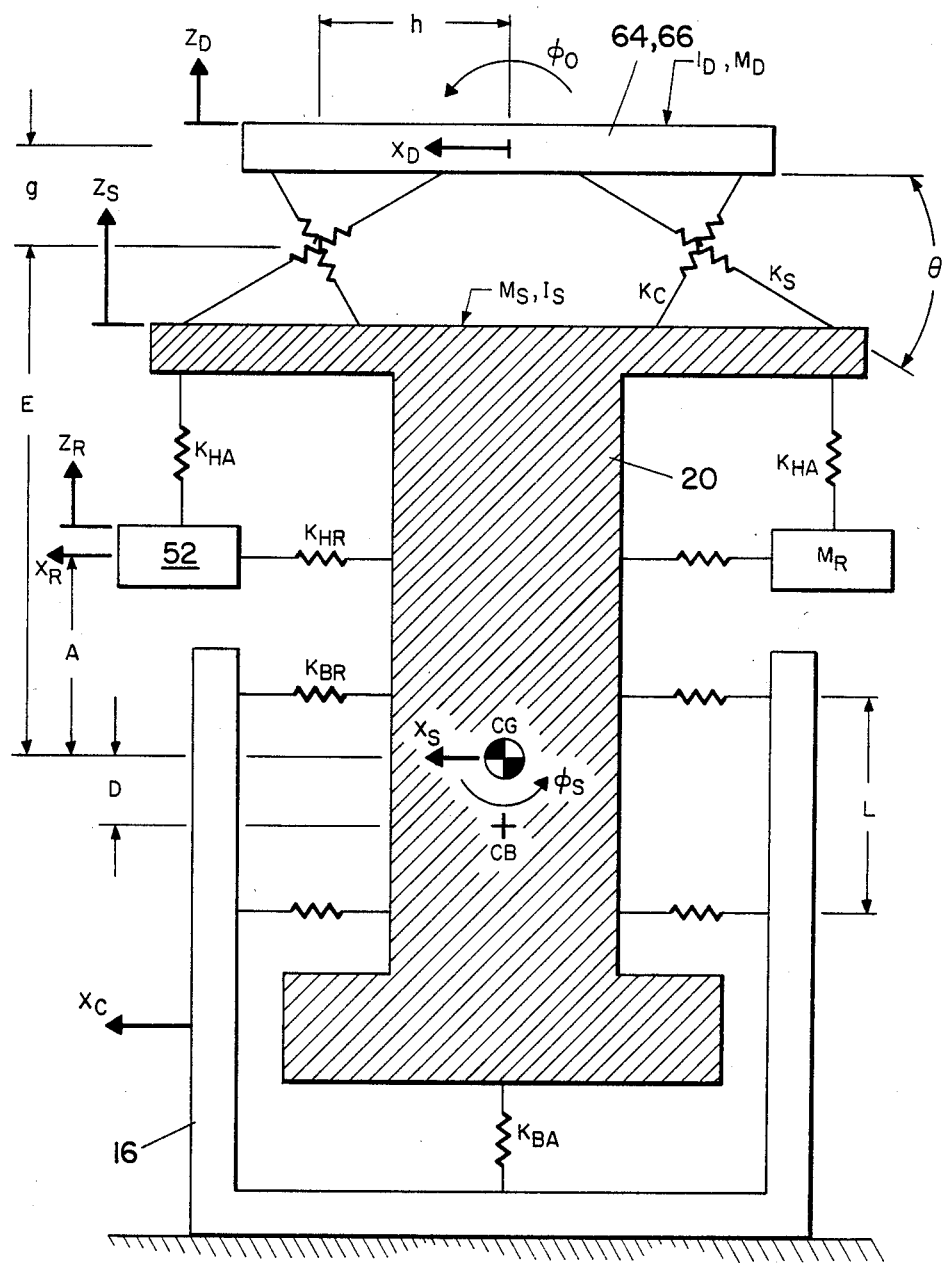
FIG. 5 is a schematic view of a dynamic elastic model of a tuned gyroscope incorporating dynamic absorber in accordance with the present invention.

FIG. 5 is a dynamic elastic model of a gyroscope system generally in accordance with the configuration of FIG. 1 and incorporating the absorber of the present invention. The equations of motion for such a system in the radial mode are summarized by the following matrix $$\begin{bmatrix} \text{FORCES ON ROTOR} \\ \text{FORCES ON SHAFT} \\ \text{TORQUES ON SHAFT} \\ \text{FORCES ON DAMPER} \\ \text{TORQUES ON DAMPER} \end{bmatrix} \begin{bmatrix} (M_R S^2 + K_{HR}) & -K_{HR} & -AK_{HR} & 0 & 0 \\ -K_{HR} & (M_S S^2 + K_{BR} + K_{HR} + K_X) & (AK_{HR} - DK_{BR} + K_{SS}) & -K_X & K_{X\phi} \\ -AK_{HR} & (AK_{HR} - DK_{BR} + K_{SS}) & (I_S S^2 + K_{B\phi} + A^2 K_{HR} + K_{\phi S} + D^2 K_{BR}) & -K_{SS} & -K_{SD} \\ 0 & -K_X & -K_{SS} & M_D S^2 + K_X & -K_{X\phi} \\ 0 & K_{X\phi} & -K_{SD} & -K_{X\phi} & I_D S^2 + K_\phi \end{bmatrix} \begin{bmatrix} X_R \\ X_S \\ \phi_S \\ X_D \\ \phi_D \end{bmatrix} = \begin{bmatrix} 0 \\ K_{BR} X_C \\ -DK_{BR} X_C \\ 0 \\ 0 \end{bmatrix}$$

Similarly, the equations of axial motion follow:

$$\begin{bmatrix} (M_R S^2 + K_{HA}) & -K_{HA} & 0 \\ -K_{HA} & (M_S S^2 + K_{BA} + K_{HA} + K_Z) & -K_Z \\ 0 & -K_Z & (M_D S^2 + K_Z) \end{bmatrix} \begin{bmatrix} Z_R \\ Z_S \\ Z_D \end{bmatrix} = \begin{bmatrix} 0 \\ K_{BA} Z_C \\ 0 \end{bmatrix}$$

In the foregoing sets of equation, the various terms are defined as follows:

$M_R, M_S, M_D$ = mass of rotor, shaft, damper;
$I_S, I_D$ = moment of inertia of shaft, damper;
$X_R, X_S, X_D$ = translational radial movement of rotor, shaft, damper;
$Z_R, Z_S, Z_D$ = translational axial movement of rotor, shaft, damper;
$\phi_S, \phi_D$ = rotational movement of shaft, damper;
$K_{HR}, K_{BR}$ = total radial stiffness of hinges, bearings;

$K_{B\phi} = \dfrac{K_{BR} L^2}{4}$ = total torsional stiffness of bearings;

$K_{HA}, K_{BA}$ = total axial stiffness of hinges, bearings;
$K_S$ = shear spring rate of a single absorber's pad;
$K_C$ = tension-compression spring rate of absorber's pad;

$\gamma = \dfrac{K_C}{K_S}$ = compression to shear modulus ratio;

$K_X$ = $2K_S(1 + \cos^2\theta + \gamma\sin^2\theta)$;
$K_{SS}$ = $EK_X - hK_S(\gamma - 1)\sin 2\theta$;
$K_{X\phi}$ = $gK_X + hK_S(\gamma - 1)\sin 2\theta$;
$K_Z$ = $4K_S(\gamma\cos^2\theta + \sin^2\theta)$;
$K_{\phi S}$ = $E[K_{SS} - hK_S(\gamma - 1)\sin 2\theta] + \dfrac{h^2}{2} K_Z$;

-continued $$K_{SD} = -EK_{X\phi} + ghK_S(\gamma - 1)\sin 2\theta + \frac{h^2}{2}K_Z;$$

$$K_\phi = g[K_X\phi + hK_S(\gamma - 1)\sin 2\theta] + \frac{h^2}{2}K_Z.$$

The radial mode involves many more parameters than does the axial mode. This reflects the fact that radial absorber resonant frequency depends not only upon absorber mass and elastomer stiffness but also upon the location of the center of gravity of the absorber relative to that of the shaft and the point of attachment of the elastomer. In addition, the moment of inertia of the elastomer may be utilized to control radial resonant frequency (axial frequency fixed). The cantilever location of the absorber amplifies the absorbtion of energy transmitted by shaft rotation about the center of gravity that is inherent under radial vibration.

The preceding sets of equations provide design tools for optimization of an absorber in accordance with the invention having the general configuration of FIG. 1. By means well-known in the art, other dynamic models may be employed and sets of equations of motion derived that reflect alternative modes within the scope of the invention such as the mounting of a dynamic absorber comprising damping mass and elastomeric body (bodies) to the rotor or shaft of the gyroscope 10. Likewise tuned gyroscope configurations may vary from that of FIG. 1; however, as long as the gyroscope includes a rotating element the adaptation of the elements of the present invention thereto would be evident to one skilled in the art. The analysis of all appropriate system models, such as those defined in the preceding matrixes, is well within the scope of those skilled in the art. Such analysis of the appropriate equations is undertaken with a view to selection of optimum absorber parameters for minimizing the transmissibility of harmonic vibrations within the gyroscope. Computer aided iterative methods, provide a useful tool in such analysis that can be employed to achieve maximum damping at resonant frequencies. Thus, an absorber design may be achieved which substantially lessens the transmissibility of resonant vibrations and thus enhances the accuracy and durability of a gyroscope in accordance with the invention.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention.

What is claimed is:

1. A tuned gyroscope comprising, in combination:
   (a) a flexibly mounted rotor;
   (b) a reactive mass, said mass being substantially symmetrical about the spin axis of said rotor; and
   (c) means mounting said mass for rotation with said rotor, said means including at least one elastomeric body.

2. A tuned gyroscope as defined in claim 1 wherein said mass is fixed to the rotor of said gyroscope.

3. A tuned gyroscope as defined in claim 1 wherein said mass is fixed to the shaft of said gyroscope.

4. A tuned gyroscope as defined in claim 1 wherein said mass is fixed to the rotor stop of said gyroscope.

5. A tuned gyroscope as defined in claim 1 additionally characterized in that said reactive mass is ring shaped.

6. A tuned gyroscope as defined in claim 5 further including elastomeric material adjacent the inner edge of said ring shaped reactive mass.

7. A tuned gyroscope as defined in claim 6 wherein said elastomeric material is arranged so that said ring shaped reactive mass is fixed to and axially disposed with respect to the rotor stop of said tuned gyroscope.

8. An absorber for reducing the transmissibility of resonant vibrations in a tuned gyroscope of the type that includes a flexibly-mounted rotor, said absorber comprising in combination:
   (a) a reactive mass, said mass being substantially symmetrical about the spin axis of said rotor; and
   (b) mean mounting said mass for rotation with said rotor, said mass inclduing at least one elastomeric body.

9. An absorber as defined in claim 1 wherein said mass is the rotor of said gyroscope.

10. An absorber as defined in claim 1 wherein said mass is fixed to the shaft of said gyroscope.

11. An absorber as defined in claim 1 wherein said mass is fixed to the rotor stop of said gyroscope.

12. An absorber as defined in claim 1 additionally characterized in that said reactive mass is ring shaped.

13. An absorber as defined in claim 13 further including elastomeric material adjacent the inner edge of said ring shaped reactive mass.

14. An absorber as defined in claim 13 wherein said elastomeric material is arranged so that said ring shaped reactive mass is fixed to and axially disposed with respect to the rotor stop of said tuned gyroscope.

* * * * *